United States Patent
Wu et al.

(10) Patent No.: US 10,359,122 B2
(45) Date of Patent: Jul. 23, 2019

(54) CONTROL VALVE FOR A WATER SOFTENER

(71) Applicant: WENZHOU RUNXIN MANUFACTURING MACHINE CO., LTD., Wenzhou, Zhejiang (CN)

(72) Inventors: Xiao-Rong Wu, Zhejiang (CN); Hai-Lin Yuan, Zhejiang (CN); Xian-Shui Wu, Zhejiang (CN)

(73) Assignee: WENZHOU RUNXIN MANUFACTURING MACHINE CO., LTD., Wenzhou, Zhejiang (CN)

( * ) Notice: Subject to any disclaimer, the term of this patent is extended or adjusted under 35 U.S.C. 154(b) by 326 days.

(21) Appl. No.: 15/112,920

(22) PCT Filed: Jan. 20, 2015

(86) PCT No.: PCT/CN2015/071056
§ 371 (c)(1),
(2) Date: Jul. 20, 2016

(87) PCT Pub. No.: WO2015/106723
PCT Pub. Date: Jul. 23, 2015

(65) Prior Publication Data
US 2016/0341322 A1 Nov. 24, 2016

(30) Foreign Application Priority Data

Jan. 20, 2014 (CN) .......................... 2014 1 0025506
Jul. 31, 2014 (CN) ..................... 2014 2 0428495 U
Jan. 16, 2015 (CN) .......................... 2015 1 0023249

(51) Int. Cl.
*F16K 11/074* (2006.01)
*C02F 1/42* (2006.01)
*C02F 5/00* (2006.01)

(52) U.S. Cl.
CPC ............ *F16K 11/0743* (2013.01); *C02F 1/42* (2013.01); *C02F 5/00* (2013.01); *C02F 2201/005* (2013.01); *C02F 2303/16* (2013.01)

(58) Field of Classification Search
CPC .. C02F 1/42; C02F 2201/005; C02F 2303/16; C02F 5/00; F16K 11/0743
See application file for complete search history.

(56) References Cited

U.S. PATENT DOCUMENTS 7,549,446 B2    6/2009   Yang et al.

FOREIGN PATENT DOCUMENTS

CN          2719820 Y   *   8/2005
CN        201305482 Y       9/2009
(Continued)

*Primary Examiner* — Matthew O Savage
(74) *Attorney, Agent, or Firm* — Muncy, Geissler, Olds & Lowe, P.C.

(57) ABSTRACT

A control valve with a planar seal structure having a valve body with a water inlet, water outlet, and water drainage port. A spool with a planar seal structure and having fixed valve plate and movable valve plate is disposed in the valve body. The movable valve plate is rotationally fitted to the fixed valve plate. The fixed valve plate has a plurality of through-holes. One through-hole with an arc and fan shape is in communication with the water outlet. The outer diameter of the through-hole with an arc and fan shape is greater than that of another through-hole of the fixed valve plate. The through-hole is in communication with the valve body's water inlet. The fixed valve plate has at least one arc communicating blind hole. The through-holes of the fixed valve plate are mutually fitted with the communicating blind hole.

9 Claims, 14 Drawing Sheets

(56) References Cited

FOREIGN PATENT DOCUMENTS

| | | | |
|---|---|---|---|
| CN | 102635706 A | 8/2012 | |
| CN | 102840362 A | 12/2012 | |
| CN | 103994250 A | 8/2014 | |
| JP | 413745682 B2 | 8/2008 | |
| WO | WO-2013155879 A1 * | 10/2013 | ............ F16K 11/074 |

* cited by examiner

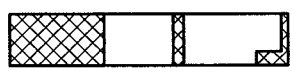
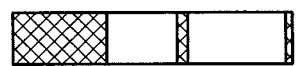
FIG. 9A          FIG. 10A
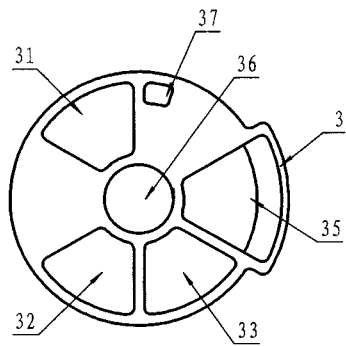
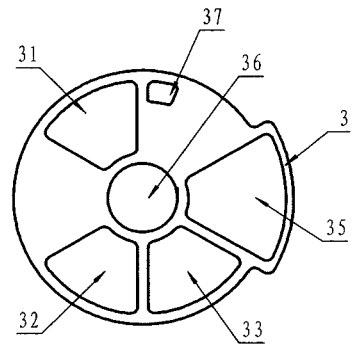
FIG. 9          FIG. 10

CONTROL VALVE FOR A WATER SOFTENER

BACKGROUND OF THE INVENTION

1. Field of the Invention

This invention relates to the field of water treatment system, especially for the control valve that adopting hermetic head faces construction.

2. Description of the Related Art

In recent years, with the wider application of the control valve with hermetic head faces construction in water treatment field, the market has approved the structure of flat valve. Nowadays, industrial or residential water treatment systems must use the control valve to switch channel. For the control valve of softener system, it should achieve softening, backwash, brine draw, brine refill and fast rinse these functions; for the control valve of filter system, it should achieve filtration, backwash and fast rinse these functions. For illustration purposes, the backwash, brine draw, brine refill and fast rinse of softener system are collectively called as regeneration process; the backwash and fast rinse of filter system are collectively called as rinse process.

For industrial fields, especially for the water treatment system that is applied to steam boiler, the hardness of water should be no more than 0.03 mmol/L when it goes into the boiler. Therefore, it often requires that there is no raw water flows into the boiler when the control valve in the regeneration process of the water treatment system. Thus, the existing flat valves on the market are with this structure basically, namely there is no water flows out when in regeneration process. For hot water boilers, the requirement of inlet water hardness is lower, not higher than 0.6 mmol/L. the regeneration process of water treatment system generally takes more than two hours, rinse process usually takes 30 minutes. For the water treatment system that no water flows out from outlet when in the regeneration process, to ensure an adequate water supply to the rear systems during the regeneration or rinse process, it requires the larger water tank.

For residential water treatment systems, especially for household water treatment systems, the requirement of inlet water is lower. The residential water treatment systems generally are without the water tank, which leads to no water supply when need water urgently when in regeneration or rinse process. Therefore, in the market of North America and Europe, the household water treatment systems can provide the raw water when in regeneration or rinse process. The raw water described in this article refers to untreated water.

Existing water treatment control valve adopts hermetic head faces construction. Such as Chinese patent CN201305482Y Multi-functional Softener Valve, CN201305482Y Multi-functional Softener Valve, which provides a kind of control valve that sets the fixed disk to three layers—the outermost layer is outlet; The moving disk only matches to fixed disk in service status, and in other status, the moving disk can not cover the outlet completely. This structure makes the valve body with complicated structure, moving disk and fixed disk complicated, and makes trouble.

SUMMARY OF THE INVENTION

The present invention provides a control valve to overcome the deficiency of no raw water flowing out when the existing flat valve in regeneration or rinse process, and it is applicable to all of softener systems and filter systems.

To achieve the above objects, the present invention provides a control valve including a valve body, wherein: the valve body is provided with an inlet, an outlet and a drain, a valve core located in the valve body, wherein the valve core is provided with a fixed disk and a moving disk, wherein a mating face of the fixed disk engages a mating face of the moving disk, wherein a center of the fixed disk is coaxially aligned with a center of the moving disk on an axis of rotation, wherein major portions of the outer edges of the fixed disk and the moving disk are circular and have a same diameter relative to their centers, wherein a flow space connected to the inlet is defined between an interior of the valve body and radially outer portions of the fixed disk and moving disk, wherein the moving disk is arranged to rotate relative to the fixed disk, wherein the fixed disk is provided with a plurality of through-holes extending axially through the fixed disk from the mating face to an opposing face thereof, wherein one of the through-holes in the face of the fixed disk is arc-shaped and is an outlet through-hole connected only to the outlet via an outlet passage in the valve body, wherein the fixed disk includes a radical arc-shaped bulge extending radially outwardly from the major circular portion of the fixed disk, wherein the outlet through-hole in the fixed disk extends radially outwardly into the radial arc-shaped bulge and includes an outer edge portion that is located further from the axis of rotation than the major portion of the outer edge of the moving disk having the same diameter, whereby flow communication between the inlet and the outlet is provided when the radially outer edge of the moving disk having the same diameter is in radial alignment with the radially outer edge of the outlet through-hole in the fixed disk, the outlet through-hole in the fixed disk and other through-holes in the fixed disk include portions located at a fixed distance relative to the center of the fixed disk, wherein a radially outer edge of the outlet through-hole of the fixed disk is located further from the center of the fixed disk than radially outer edges of the other through-holes of the fixed disk, wherein a radially inner edge of the outlet through-hole of the fixed disk is located closer to the center of the fixed disk than outer edges of the other through-holes of the fixed disk, wherein the moving disk is provided with an inlet through-hole that is open to the flow space, at least one blind hole located on the mating face of the moving disk that is arc-shaped, and the through-holes of the fixed disk being positioned to align with the through-hole and at least one blind hole of the moving disk.

Preferably, a radially outer edge of the blind hole of the moving disk is located further from the center of the moving disk than the radially outer edge of the through-hole of the moving disk.

Preferably, the fixed disk includes five or six through-holes arranged in five equal parts or six circumferential sectors of the fixed disk, wherein the moving disk includes an radial arc-shaped bulge extending radially outwardly from a circular periphery of the moving disk, wherein the blind hole of the moving disk extends radially outwardly into the radial arc-shaped bulge of the moving disk, and wherein the through-holes of the fixed disk can be aligned with the through hole and at least one blind hole of the moving disk as the moving disk is rotated.

Preferably, the outlet through-hole of the fixed disk and the blind hole located in the moving disk are aligned with each other when the control valve is in a softener or filter status.

Preferably, the outlet through-hole of the fixed disk and the blind hole located within the same diameter of the moving disk are overlapped incompletely to provide flow from the inlet to the outlet when the control valve is in regeneration or rinse status.

Preferably, the control valve further includes a water softener connected to the control valve.

Preferably, the control valve further includes an injector, wherein the valve body is further provided with a drain channel and a brine absorption branch of a flow channel, the valve body is further provided with an upper filter connector, a lower filter connector, and an injector inlet, an injector outlet connected to the lower filter, a brine inlet is connected to the brine absorption branch of the flow channel, the through-holes are respectively distributed in six equal circumferential sectors on the mating face of the fixed disk, on the mating face of the fixed disk, in a counterclockwise direction, a first through-hole and a second through-hole are connected to the upper filter connector via respective flow passages, a third through-hole on the face of the fixed disk is connected to the lower filter connector via a flow passages, a fourth through-hole on the face of the fixed disk is the outlet through-hole connected to the outlet via the flow space, a fifth through-hole on the face of the fixed disk is connected to the injector inlet, a sixth through-hole on the face of and in a center of the fixed disk that is connected to the drain of the valve body, wherein the moving disk includes two blind holes including a radial blind hole that is from the center to circumferential direction in the mating face and an arc-shaped blind hole in the mating face, wherein the moving disk includes a radial arc-shaped bulge extending radially outwardly from a circular periphery of the moving disk, wherein the arc-shaped blind hole of the moving disk extends radially outwardly into the radial arc-shaped bulge of the moving disk, wherein a radially outer edge of the arc-shaped blind hole of the moving disk is located further from the center of the moving disk than a radially outer edge of the through-hole of the moving disk, and the arc-shaped bulge of the fixed disk is the same size and shape as the arc-shaped bulge of the moving disk.

Preferably, the injector inlet and the injector outlet are set on the brine absorption branch of the flow channel.

Preferably, the valve body is connected to a tank containing an ion exchange resin, wherein the upper filter connector and the lower filter connector are located within the tank.

In use, when the control valve is in softener or filter status, the through-hole of moving disk is connected to inlet all the time, the arc-shaped bulge of blind hole in moving disk and the one in fixed disk overlap and match with each other. When the control valve is in regeneration or rinse status, the through-hole of moving disk is connected to inlet all the time, the arc-shaped bulge of blind hole in moving disk and the one in fixed disk overlap incompletely. At that time, a part of water from inlet flows through this incompletely overlapped part into the through-hole of fixed disk that connected to outlet. Finally, the water flows out from outlet.

BRIEF DESCRIPTION OF THE DRAWINGS

FIG. 9 is a top view of one kind of fixed disk for the control valve that raw water flows out in regeneration status; (The surface of fixed disk is divided to six equal parts) FIG. 9A is a cross-sectional view of FIG. 9;

FIG. 10 is a top view of another kind of fixed disk for the control valve that raw water flows out in regeneration status; FIG. 10A is a cross-sectional view of FIG. 10;

DESCRIPTION OF THE PREFERRED EMBODIMENTS

Existing control valve with hermetic head faces construction that has a variety of matching ways of moving disk and fixed disk. In the fixed disk, there has set different numbers of holes that in cooperation with the moving disk. And the layouts of the holes are five equal parts, six equal parts, seven equal parts, eight equal parts, nine equal parts, ten equal parts, eleven equal parts and twelve equal parts, etc. Sometimes, the holes are set not in equal parts. Some moving disks have a through-hole and a blind hole, and some moving disks have many through-holes and many blind holes.

The control valve of the present invention can be used to softener system, also can be used to filter system. When used to softener system, the valve body is provided with inlet, outlet, drain and brine inlet, injector inlet and injector outlet, and nozzle of injector. When used to filter system, the valve body is provided with inlet, outlet and drain.

It is the structure shown in FIG. 1 to FIG. 4 that no raw water flows out in the existing water treatment regeneration process, which has described in Patent CN2719820Y Multi-functional Flow Control Valve for Water Treatment System, and it is unnecessary to go into details here.

It is another structure shown in FIG. 5 to FIG. 8 that no raw water flows out in the existing water treatment regeneration process.

Example 1

It is the project shown in FIG. 9 to FIG. 14 that refilling with soft water and raw water flowing out when in regeneration status for the up-flow regeneration softener valve, which has the fixed disk with six equal parts structure.

Figure 2A:
FIG. 2A is a cross-sectional view of FIG. 2.
Figure 1:
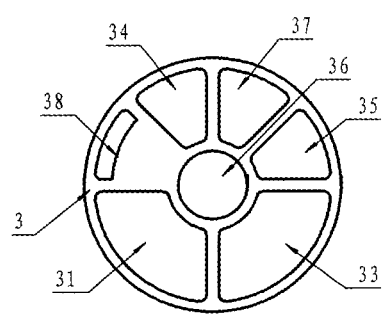
FIG. 1 is a top view of one kind of fixed disk for the control valve that is no water flows out in regeneration status.
Figure 2:
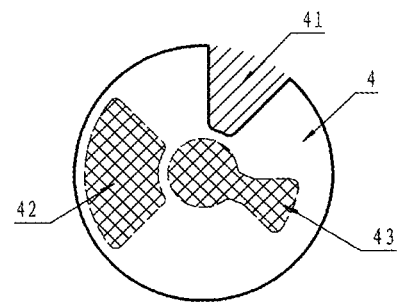
FIG. 2 is a top view of one kind of moving disk that matching with FIG. 1.
Figure 3:
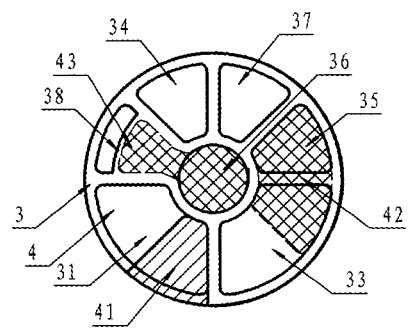
FIG. 3 is a combinatorial drawing of the moving disk and fixed disk when the system in service status that composed of FIG. 1 and FIG. 2.
Figure 4:
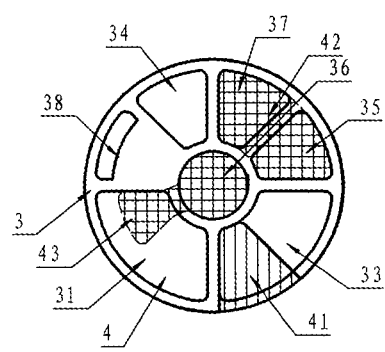
FIG. 4 is a combinatorial drawing of the moving disk and fixed disk when the system in backwash status that composed of FIG. 1 and FIG. 2.
Figure 6A:
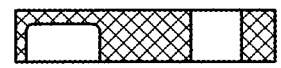
FIG. 6A is a cross-sectional view of FIG. 6.
Figure 5:
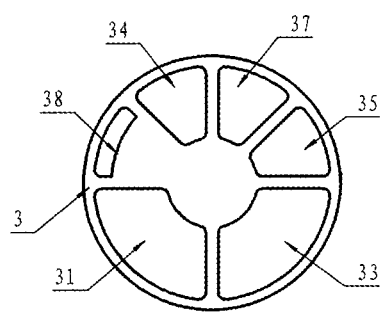
FIG. 5 is a top view of another kind of fixed disk for the control valve that is no water flows out in regeneration status.
Figure 6:
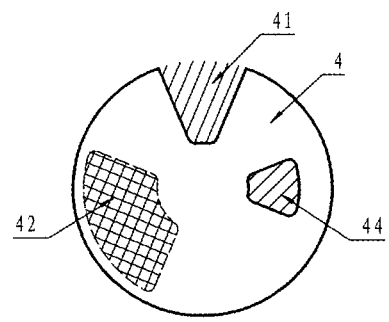
FIG. 6 is a top view of one kind of moving disk that matching with FIG. 5.
Figure 7:
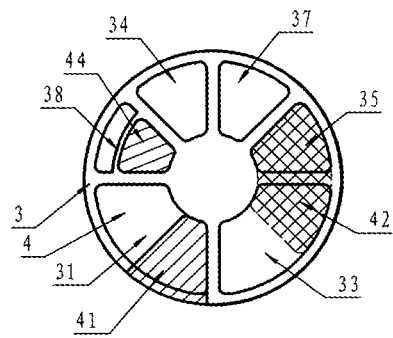
FIG. 7 is a combinatorial drawing of the moving disk and fixed disk when the system in service status that composed of FIG. 5 and FIG. 6.
Figure 8:
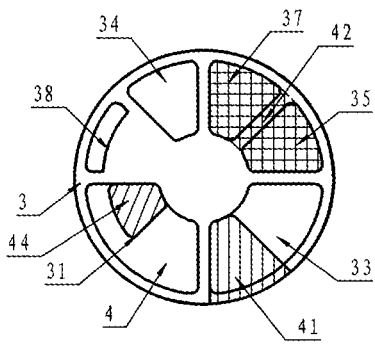
FIG. 8 is a combinatorial drawing of the moving disk and fixed disk when the system in backwash status that composed of FIG. 5 and FIG. 6.
Figure 11A:
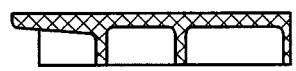
FIG. 11A is a cross-sectional view of FIG. 11.
Figure 12A:
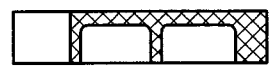
FIG. 12A is a cross-sectional view of FIG. 12.
Figure 11:
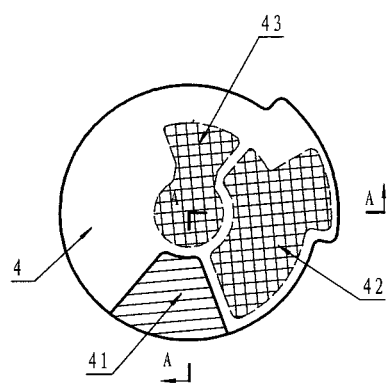
FIG. 11 is a top view of one kind of moving disk that matching with FIG. 9 or FIG. 10.
Figure 12:
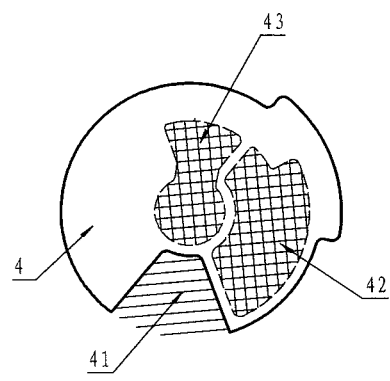
FIG. 12 is a top view of another kind of moving disk that matching with FIG. 9 or FIG. 10.
Figure 13:
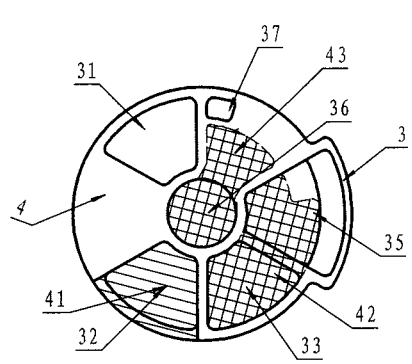
FIG. 13 is a combinatorial drawing of the moving disk and fixed disk when the system in service status that composed of FIG. 9 and FIG. 12.
Figure 14:
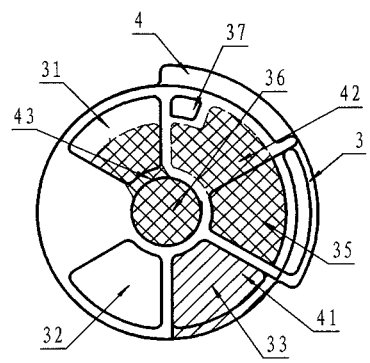
FIG. 14 is a combinatorial drawing of the moving disk and fixed disk when the system in backwash status that composed of FIG. 9 and FIG. 12.
Figure 15A:
FIG. 15A is a cross-sectional view of FIG. 15.
Figure 16A:
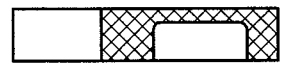
FIG. 16A is a cross-sectional view of FIG. 16.
Figure 15:
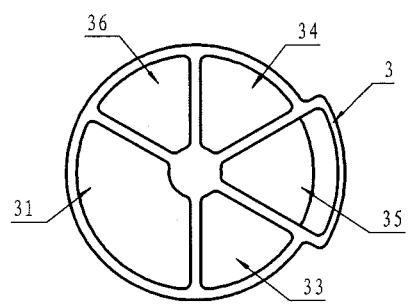
FIG. 15 is a top view of one kind of fixed disk for the control valve that raw water flows out in rinse status in filter system; (The surface of fixed disk is divided to six equal parts)
Figure 16:
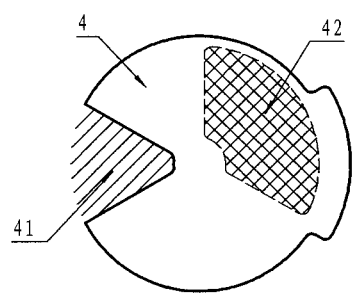
FIG. 16 is a top view of one kind of moving disk that matching with FIG. 15.
Figure 17:
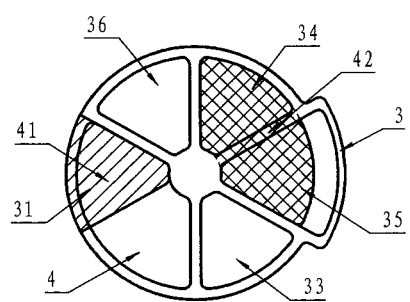
FIG. 17 is a combinatorial drawing of the moving disk and fixed disk when the system in filter status that composed of FIG. 15 and FIG. 16.
Figure 18:
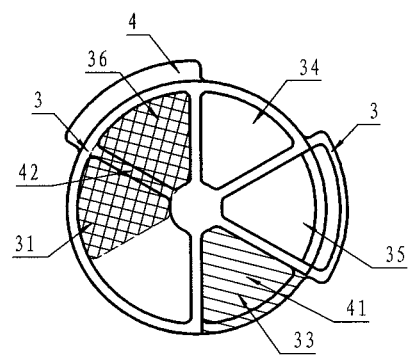
FIG. 18 is a combinatorial drawing of the moving disk and fixed disk when the system in backwash status that composed of FIG. 15 and FIG. 16.
Figure 19:
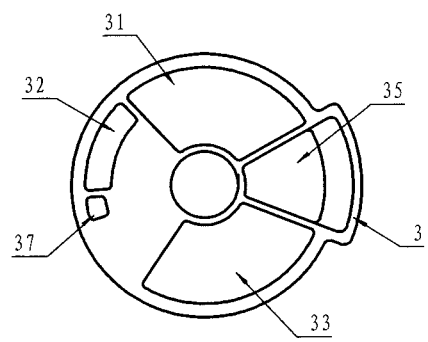
FIG. 19 is a top view of one kind of fixed disk for the control valve that raw water flows out in regeneration status; (The surface of fixed disk is divided to seven equal parts)
Figure 20:
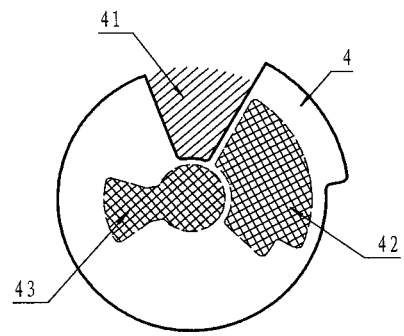
FIG. 20 is a top view of one kind of moving disk that matching with FIG. 19.
Figure 21:
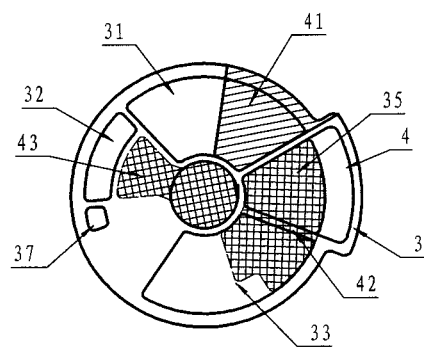
FIG. 21 is a combinatorial drawing of the moving disk and fixed disk when the system in service status that composed of FIG. 19 and FIG. 20.
Figure 22:
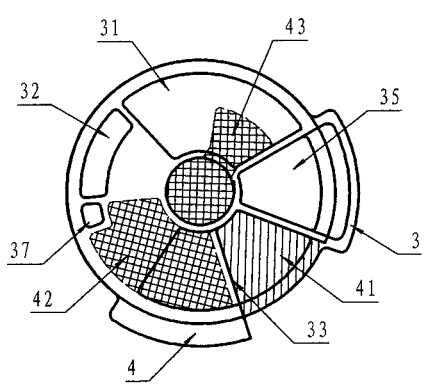
FIG. 22 is a combinatorial drawing of the moving disk and fixed disk when the system in backwash status that composed of FIG. 19 and FIG. 20.
Figure 23A:
FIG. 23A is a cross-sectional view of FIG. 23.
Figure 24A:
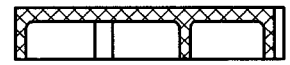
FIG. 24A is a cross-sectional view of FIG. 24.
Figure 23:
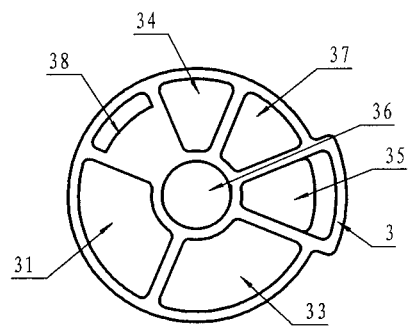
FIG. 23 is a top view of one kind of fixed disk for the control valve that raw water flows out in regeneration status; (The surface of fixed disk is divided to eight equal parts)
Figure 24:
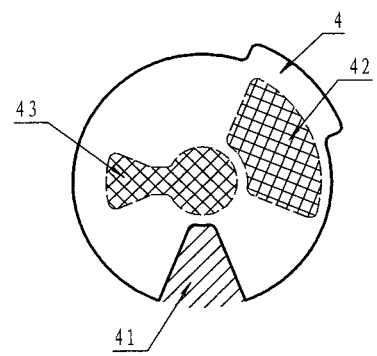
FIG. 24 is a top view of one kind of moving disk that matching with FIG. 23.

This example uses a fixed disk and a moving disk shown in FIG. 10 and FIG. 11. The control valve of the multi-functional softener valve in this example includes a valve body 1, and a water softener is connected to the control valve. The valve body 1 is provided with an inlet 20, an outlet 21, a drain 22, an upper filter connector 16, a lower filter connector 17 and a branch of flow channel 26. The valve body is connected to a tank 10 containing an ion exchange resin, and the upper filter connector 16 and the lower filter connector 17 are located within the tank 10. On branch of flow channel, there is an injector inlet 24, an injector outlet 25 that connected to the lower filter connector 17, a brine inlet 23 and a brine control valve 5 connected to the brine inlet 23. A valve core is located in the valve body 1, and the valve core is provided with a fixed disk 3 and a moving disk 4. In the valve body 1, there is seal ring 6 and a shaft 2 that can rotate the moving disk 4. A mating face of the fixed disk 3 engages a mating face of the moving disk 4, and a center of the fixed disk 3 is coaxially aligned with a center of the moving disk 4 on an axis of rotation. Major portions of the outer edges of the fixed disk 3 and the moving disk 4 are circular and have a same diameter relative to their centers. A flow space connected to the inlet 20 is defined between an interior of the valve body 1 and radially outer portions of the fixed disk 3 and the moving disk 4. The moving disk 4 is arranged to rotate relative to the fixed disk 3. The fixed disk 3 is provided with a plurality of through-holes extending axially through the fixed disk 3 from the mating face to an opposing face thereof. There is a sixth through-hole 36 connected to drain 22 of the valve body in the center of the fixed disk 3. On the mating face of the fixed disk 3, in a counterclockwise direction, there are five through-holes. A first through-hole 31 and a second through-hole 32 are connected to the upper filter connector 16 via respective flow passages, a third through-hole 33 is connected to the lower filter connector 17 via a flow passages, a fourth through-hole 35 is connected to outlet 21 via an outlet passage in the valve body 1, and a fifth through-hole 37 is connected to the injector inlet 24 by branch of flow channel 26. The fourth through-hole 35 includes a radical arc-shaped bulge extending radially outwardly from the major circular portion of the fixed disk 3. The fourth through-hole 35 extends radially outwardly into the radial arc-shaped bulge and includes an outer edge portion that is located further from the axis of rotation than the major portion of the outer edge of the moving disk 4 having the same diameter, whereby flow communication between the inlet 20 and the outlet 21 is provided when the radially outer edge of the moving disk 4 having the same diameter is in radial alignment with the radially outer edge of the fourth through-hole 35 in the fixed disk 3. The fourth through-hole 35 in the fixed disk 3 and other through-holes in the fixed disk 3 includes portions located at a fixed distance relative to the center of the fixed disk 3, wherein a radially outer edge of the fourth through-hole 35 of the fixed disk 3 is located further from the center of the fixed disk 3 than radially outer edges of the other through-holes of the fixed disk 3, and a radially inner edge of the fourth through-hole 35 of the fixed disk 3 is located closer to the center of the fixed disk 3 than outer edges of the other through-holes of the fixed disk 3. The moving disk 4 is provided with through-hole 41 that is open to the flow space, a radial blind hole 43 that is arc-shaped and is from the center to circumferential direction in the mating face of the moving disk 4, and an arc-shaped blind hole 42 that round the central in the mating face of the moving disk 4. The moving disk 4 further includes a radial arc-shaped bulge extending radially outwardly from a circular periphery of the moving disk 4, wherein the arc-shaped blind hole 42 of the moving disk 4 extends radially outwardly into the radial arc-shaped bulge of the moving disk 4. A radially outer edge of blind hole 42 is located further from the center of the moving disk 4 than radially outer edge of the other through-holes of the moving disk 4 and as big as the outer diameter of through-hole 34. The arc-shaped bulge of the fixed disk 3 is the same size and shape as the arc-shaped bulge of the moving disk 4. The fourth through-hole 35 of the fixed disk 3 and the blind hole located in the moving disk 4 are aligned with each other. The through-holes of the fixed disk 3 can be aligned with the through hole and the blind hole of the moving disk 4 as the moving disk 4 is rotated. The fourth through-hole 35 of the fixed disk 3 and the blind hole located in the moving disk 4 are aligned with each other when the control valve is in a softener or filter status. In production, the fixed disk 3 and the moving disk 4 adopt different materials such as ceramic. The through-hole 31 and 32 of the fixed disk can be connected to be one through-hole, but it is inconvenient to process.

Such designed softener valve has the following advantages: 1, Brine draw for regeneration and brine refill can be controlled by the brine control valve 5 that only require a small flow, and the disk can be divided in six equal parts, which can increase the flow rate. 2, Brine refill can be controlled by procedure or the brine control valve 5 manually when it needs. For the softener valve of residential softener, it can achieve brine refill after service, in service, or any other time when it needs, which has a wider range of applications. At the same time, it can save regeneration time. 3, Controlling by the brine control valve 5, the brine tank can be refilled with soft water, which will enhance a better regeneration effect of resin. 4, This example adopts up-flow regeneration, which can enhance the regeneration effect of resin and save salt and water. When it in backwash, regeneration and fast rinse, part of raw water can flow out from outlet directly, which can provide the emergency water when in regeneration process.

Figure 47:
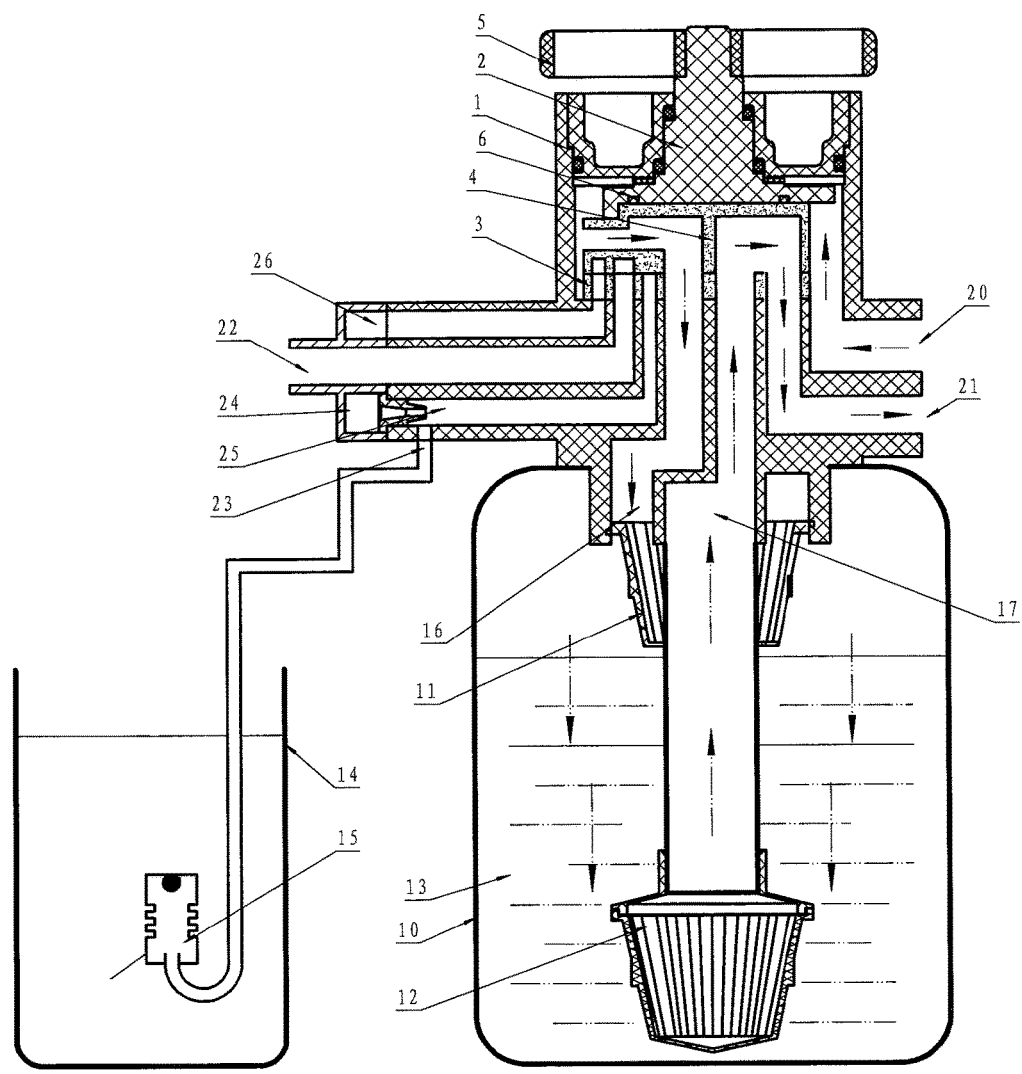
FIG. 47 is a structure schematic view of this invention that is in softening water status in FIG. 25.
Figure 48:
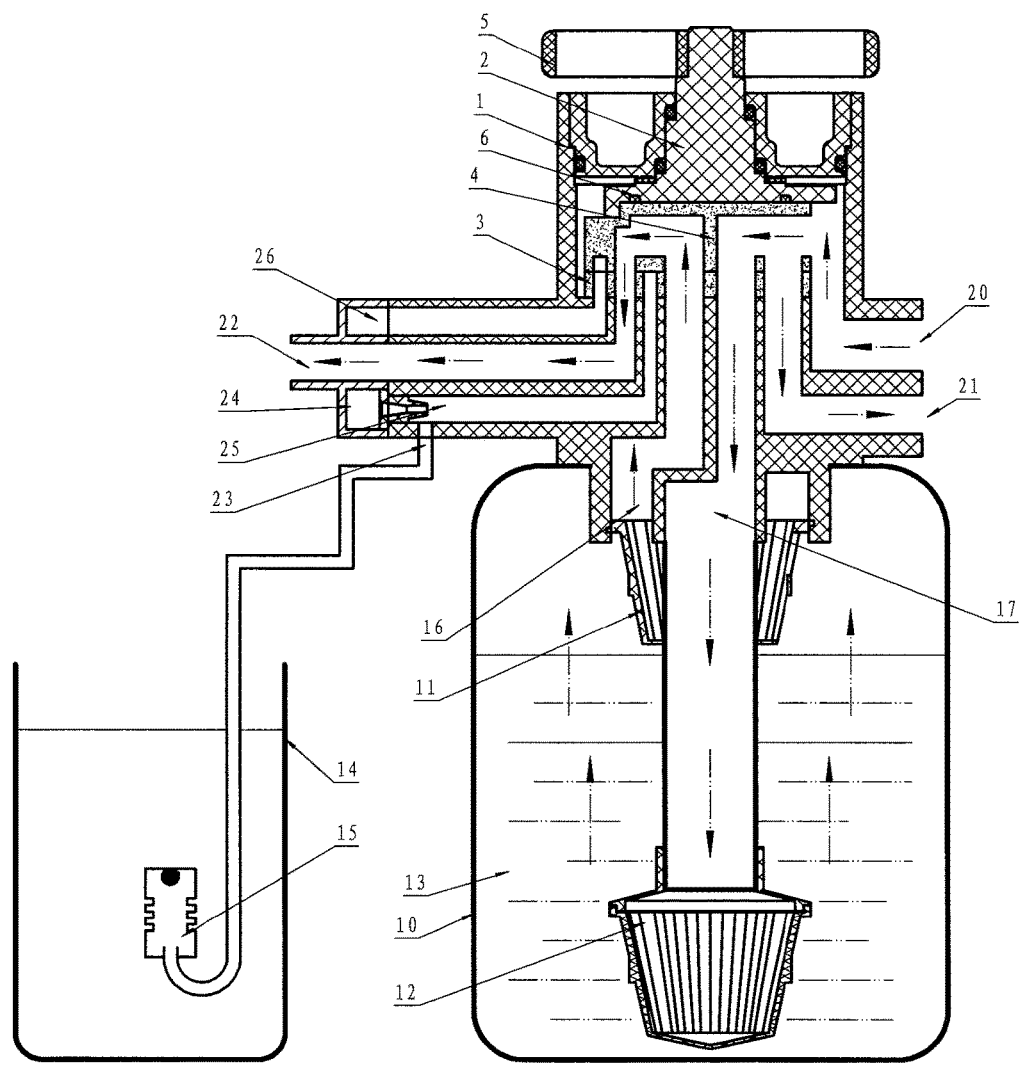
FIG. 48 is a structure schematic view of this invention that is in backwash status in FIG. 26

As shown FIG. 10, the outer diameter of the through-hole 35 is bigger than other through-hole and the edge of sealing surface; the part of outer diameter of the blind hole 42 is bigger than the edge of other sealing surface and as big as the outer diameter of the through-hole 35. The following illustration is only about the backwash status, and the other four functions are no longer specified Backwash status: Referring to FIG. 47 and FIG. 48, by rotating the shaft 2, the through-hole 41 of the moving disk 4 and the third through-hole 33 of the fixed disk 3 overlap, the blind hole 43 is connected to the first through-hole 31 and the sixth through-hole 36, the blind hole 42 is only connected to the fourth through-hole 35, and the brine control valve 5 is closed. Because the outer diameter of the fourth through-hole 35 is bigger, the sealing surface of the moving disk 4 covers it incompletely. That is, the fourth through-hole 35 of the fixed disk 3 and the blind hole 42 located within the same diameter of the moving disk 4 are overlapped incompletely when the control valve is in regeneration or rinse status. At that time, a part of water flows from the inlet 20 into the through-hole 41 and then flows into the third through-hole 33, through the valve body 1 to the lower filter connector 17, through the bottom strainer 12 to the tank 10, flows through and rinses the filter element 13, and the dirt goes through the top strainer 11 to the upper filter connector 16, then goes through the first through-hole 31 and the blind hole 43 to the sixth through-hole 36. Due to the connection of the sixth through-hole 36 and the drain 22, the water flows out from the drain 22; the other part of water flows from the inlet 20 into the fourth through-hole 35, and then flows out from the outlet 21 directly. At that time, the blind hole 42 is only connected to the fourth through-hole 35, and no water flows.

Example 2

FIG. 15 to FIG. 18 are the schematic views of the moving disk and the fixed disk that for filter pipe device of the water purifier shown in patent CN2573049Y that adds the function of flowing out raw water, and the matching schematic views of the moving disk relative to the fixed disk in filter and backwash status.

Example 3

FIG. 19 to FIG. 22 are the schematic views of the moving disk being provided with one through-hole and two blind holes when the fixed disk is divided to seven equal parts, and the matching schematic views of the moving disk relative to the fixed disk in service and backwash status.

Example 4

FIG. 23 to FIG. 26 are the schematic views of the moving disk being provided with two through-holes and one blind hole when the fixed disk is divided to eight equal parts, and the matching schematic views of the moving disk relative to the fixed disk in service and backwash status.

Example 5

FIG. 27 to FIG. 30 are the schematic views of the moving disk being provided with one through-hole and two blind holes when the fixed disk is divided to eight equal parts, and the matching schematic view of the moving disk relative to the fixed disk in service and backwash status.

Example 6

FIG. 31 to FIG. 34 are the schematic views of the moving disk being provided with two through-holes and one blind hole when the fixed disk is divided to nine equal parts, and the matching schematic view of the moving disk relative to the fixed disk in service and backwash status.

Example 7

FIG. 35 to FIG. 38 are the schematic views of the moving disk being provided with one through-hole and two blind holes when the fixed disk is divided to nine equal parts, and the matching schematic view of the moving disk relative to the fixed disk in service and backwash status.

Example 8

FIG. 39 to FIG. 42 are the schematic views of the moving disk being provided with one through-hole and two blind holes when the fixed disk is divided to ten equal parts, and the matching schematic view of the moving disk relative to the fixed disk in service and backwash status.

Example 9

FIG. 43 to FIG. 46 are the schematic views of the moving disk being provided with two through-holes and one blind hole when the fixed disk is divided to ten equal parts, and the matching schematic view of the moving disk relative to the fixed disk in service and backwash status.

Referring to FIG. 1 to FIG. 46, in the fixed disk, the through-hole 31 and the through-hole 32 are all connected to the upper filter connector, the through-hole 33 and the through-hole 34 are all connected to the lower filter connector, the through-hole 35 is connected to outlet, the through-hole 36 is connected to drain, the through-hole 37 is connected to the injector inlet, and the through-hole 38 is connected to the injector outlet; in the moving disk 4, the through-hole 41 is connected to the inlet of the valve body all the time, 42 and 43 are all blind holes, and through-hole 44 is connected to the drain of the valve body.

The illustration is only about down-flow softener that used to the softener system. For the filter system, it is no longer specified because it is similar as using to the softener system. The following illustration is about the fixed disk divided to eight equal parts and the moving disk with one through-hole and two blind holes.

Referring to FIG. 23 to FIG. 26, FIG. 47 and FIG. 48, the valve body 1 is provided with the inlet 20, the outlet 21, the drain 22, the brine inlet 23, and the flow channels connected to the top strainer 11 and the bottom strainer 12 respectively. There is the branch of the flow channel 26 in the channel from the inlet 20 of the valve body 1 to the tank. This branch of the flow channel 26 is provided with a nozzle of the injector, and there is the brine inlet 23 in the outlet of the nozzle, which is connected to the brine tank 14. The fixed disk 3 is set in the valve body 1, and achieves the matching of with the moving disk 4 by rotating the shaft 2. The fixed disk 3 of the valve body 1 has many through-holes. Among them, the through-hole 35 is connected to the outlet 21, the outer diameter of which matching with the moving disk 4 is bigger than other through-holes and form an arc-shaped bulge that is from center to circumferential direction. The described fixed disk 4 matches with the moving disk 3, and at least one through-hole 41 is connected to inlet 20 of valve body all the time. There is an arc-shaped blind hole 42 that has an arc-shaped bulge from center to circumferential direction at the place of matching with the fixed disk. The outer diameter of the arc-shaped blind hole is bigger than the described inlet through-hole. And the arc-shaped bulge of the fixed disk matches the one of the moving disk.

Figure 25:
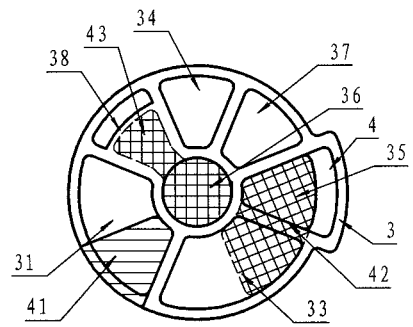
FIG. 25 is a combinatorial drawing of the moving disk and fixed disk when the system in service status that composed of FIG. 23 and FIG. 24.
Figure 45:
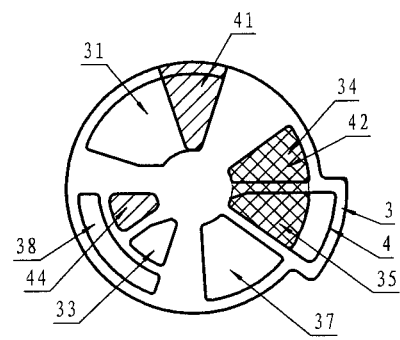
FIG. 45 is a combinatorial drawing of the moving disk and fixed disk when the system in service status that composed of FIG. 43 and FIG. 44.

Referring to FIG. 25 and FIG. 47, during normal service of softening, the through-hole 31 of the fixed disk 3 is connected to the blind hole 41 of the moving disk 4, the other through-holes of the fixed disk 3 and the other through-holes or the blind holes of the moving disk 4 are one-to-one match, which forms the flow direction shown as FIG. 45, namely, raw water flows into inlet 20, flows through the through-hole 41 of the moving disk 4, flows through the fixed disk 3, the valve body 1 and then into the top strainer 11. After treated by the filter element 13, flows into the bottom strainer 12, turns back to the through-hole 33 of the fixed disk 3 through the riser pipe, flows through the arc-shaped blind hole 42 of the moving disk 4, goes into the through-hole 35 of the fixed disk 3. Finally, it goes out from the outlet 21.

Figure 26:
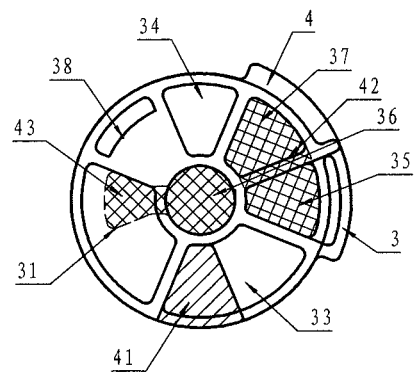
FIG. 26 is a combinatorial drawing of the moving disk and fixed disk when the system in backwash status that composed of FIG. 23 and FIG. 24.
Figure 28A:
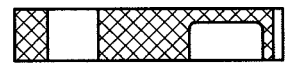
FIG. 28A is a cross-sectional view of FIG. 28.
Figure 27:
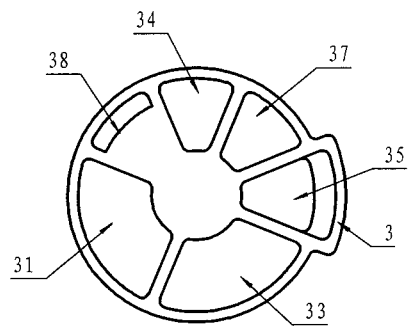
FIG. 27 is a top view of one kind of fixed disk for the control valve that raw water flows out in regeneration status; (The surface of fixed disk is divided to eight equal parts)
Figure 28:
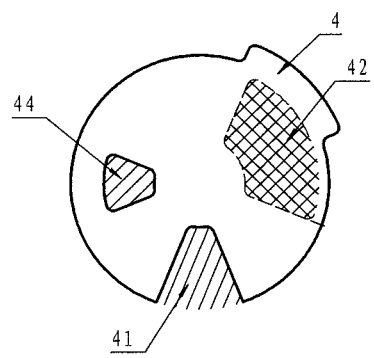
FIG. 28 is a top view of one kind of moving disk that matching with FIG. 27.
Figure 29:
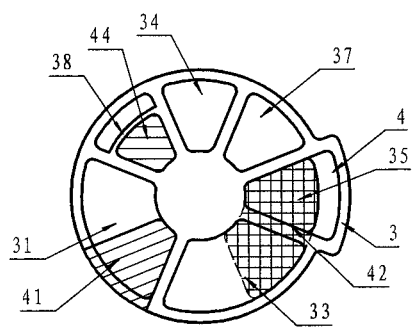
FIG. 29 is a combinatorial drawing of the moving disk and fixed disk when the system in service status that composed of FIG. 27 and FIG. 28.
Figure 30:
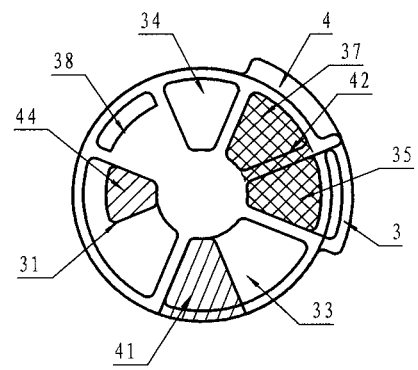
FIG. 30 is a combinatorial drawing of the moving disk and fixed disk when the system in backwash status that composed of FIG. 27 and FIG. 28.
Figure 32A:
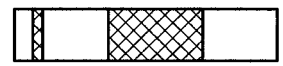
FIG. 32A is a cross-sectional view of FIG. 32.
Figure 31:
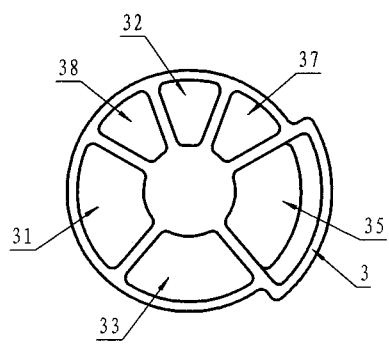
FIG. 31 is a top view of one kind of fixed disk for the control valve that raw water flows out in regeneration status; (The surface of fixed disk is divided to nine equal parts)
Figure 32:
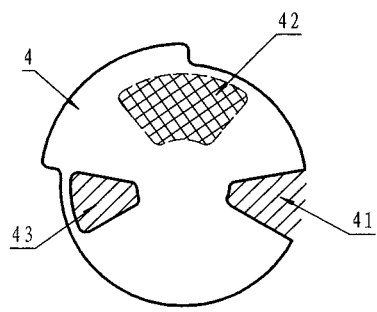
FIG. 32 is a top view of one kind of moving disk that matching with FIG. 30.
Figure 33:
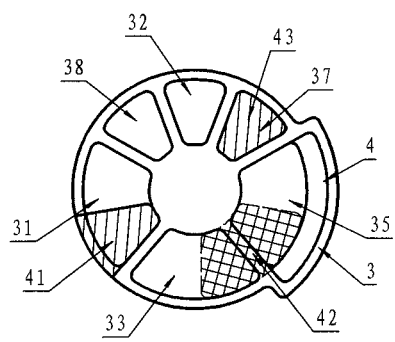
FIG. 33 is a combinatorial drawing of the moving disk and fixed disk when the system in service status that composed of FIG. 31 and FIG. 32.
Figure 34:
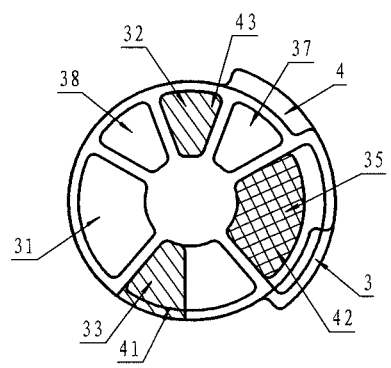
FIG. 34 is a combinatorial drawing of the moving disk and fixed disk when the system in backwash status that composed of FIG. 31 and FIG. 32.
Figure 36A:
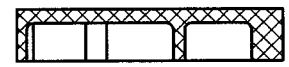
FIG. 36A is a cross-sectional view of FIG. 36.
Figure 35:
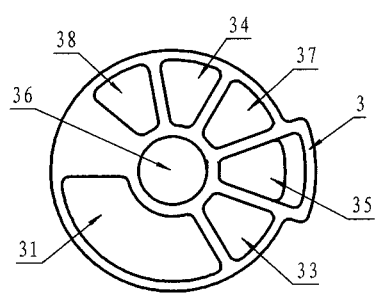
FIG. 35 is a top view of one kind of fixed disk for the control valve that raw water flows out in regeneration status; (The surface of fixed disk is divided to nine equal parts)
Figure 36:
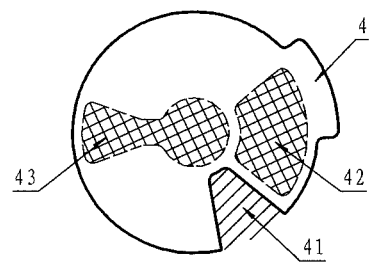
FIG. 36 is a top view of one kind of moving disk that matching with FIG. 35.
Figure 37:
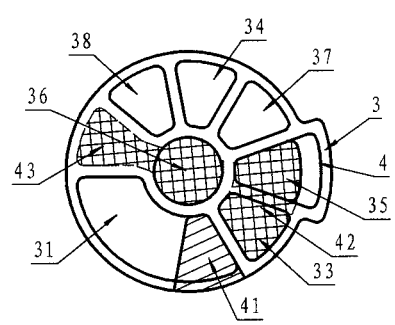
FIG. 37 is a combinatorial drawing of the moving disk and fixed disk when the system in service status that composed of FIG. 35 and FIG. 36.
Figure 38:
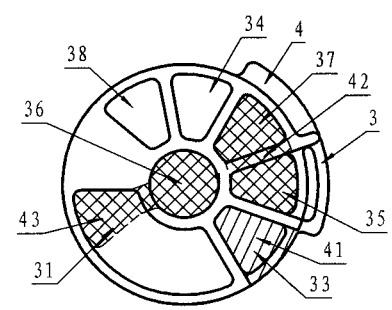
FIG. 38 is a combinatorial drawing of the moving disk and fixed disk when the system in backwash status that composed of FIG. 35 and FIG. 36.
Figure 39:
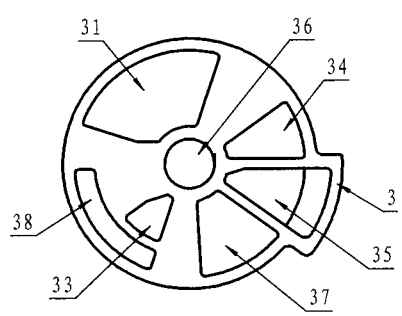
FIG. 39 is a top view of one kind of fixed disk for the control valve that raw water flows out in regeneration status; (The surface of fixed disk is divided to ten equal parts)
Figure 40:
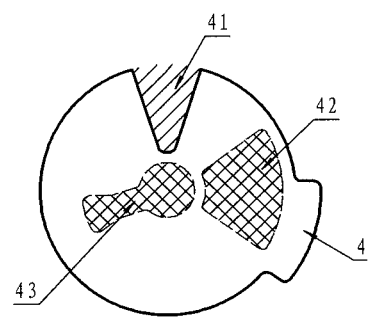
FIG. 40 is a top view of one kind of moving disk that matching with FIG. 39.
Figure 41:
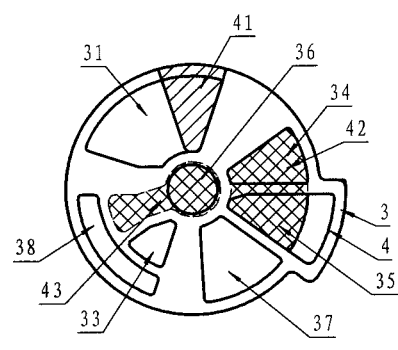
FIG. 41 is a combinatorial drawing of the moving disk and fixed disk when the system in service status that composed of FIG. 39 and FIG. 40.
Figure 42:
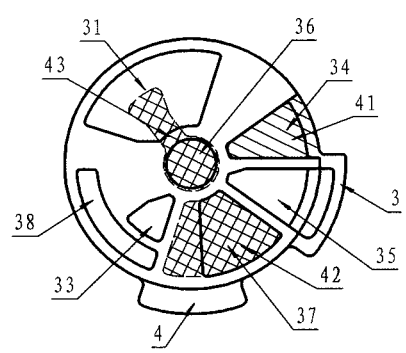
FIG. 42 is a combinatorial drawing of the moving disk and fixed disk when the system in backwash status that composed of FIG. 39 and FIG. 40.
Figure 43:
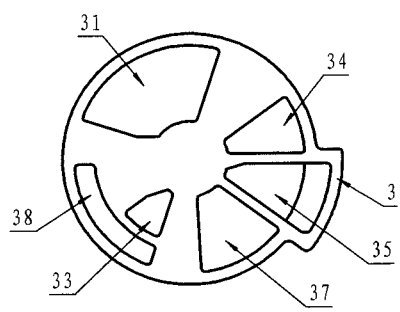
FIG. 43 is a top view of one kind of fixed disk for the control valve that raw water flows out in regeneration status; (The surface of fixed disk is divided to ten equal parts)
Figure 44:
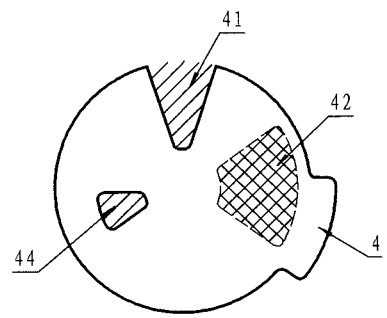
FIG. 44 is a top view of one kind of moving disk that matching with FIG. 43.
Figure 46:
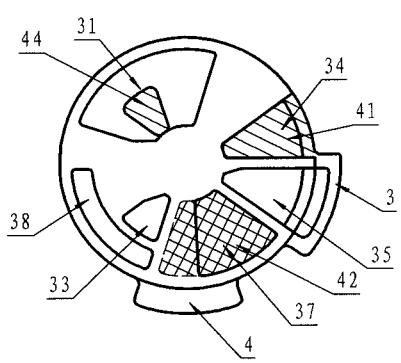
FIG. 46 is a combinatorial drawing of the moving disk and fixed disk when the system in backwash status that composed of FIG. 43 and FIG. 44.

Referring to FIG. 26 and FIG. 48, during backwash, the through-hole 31 of the fixed disk 3 and the blind hole 41 of the moving disk 4 are overlapped incompletely or not overlapped completely, the other through-holes of the fixed disk 3 and the other through-holes or blind holes of the moving disk 4 are one-to-one match, which forms the flow direction shown as FIG. 46, namely, raw water flows into the inlet 20, flows through the through-hole 41 of the moving disk 4, through the fixed disk 3 and the valve body 1 and then into the bottom strainer 12 through the riser pipe. After backwashing the filter element 13, flows into the top strainer 11, finally turns back to the through-hole 43 of the fixed disk 3, flows through the blind hole 43 of the moving disk 4, goes into the through-hole 36 of the fixed disk 3. Finally, it goes out from the drain 22. The other part of raw water flows into the through-hole 35 directly that is overlapped incompletely, and then flows out from the outlet 21.

When adopting the fixed disk and the moving disk shown as FIG. 9 and FIG. 11 or FIG. 12, FIG. 10 and FIG. 11 or FIG. 12, FIG. 15 and FIG. 16, FIG. 19 and FIG. 20, FIG. 27 and FIG. 28, FIG. 31 and FIG. 32, FIG. 35 and FIG. 36, FIG. 39 and FIG. 40, FIG. 43 and FIG. 44, which can respectively forms the matching schematic views of the moving disk relative to the fixed disk in service and backwash status shown as FIG. 11 and FIG. 12, FIG. 15 and FIG. 16, FIG. 19 and FIG. 20, FIG. 27 and FIG. 28, FIG. 31 and FIG. 32, FIG. 35 and FIG. 36, FIG. 39 and FIG. 40, FIG. 43 and FIG. 44. And the flow direction is similar as FIG. 47 and FIG. 48, which is unnecessary to go into details here.

What is claimed is:
1. A control valve, including a valve body, wherein: the valve body is provided with an inlet, an outlet and a drain,
a valve core located in the valve body,
wherein the valve core is provided with a fixed disk and a moving disk, wherein a mating face of the fixed disk engages a mating face of the moving disk, wherein a center of the fixed disk is coaxially aligned with a center of the moving disk on an axis of rotation, wherein major portions of the outer edges of the fixed disk and the moving disk are circular and have a same diameter relative to their centers, wherein a flow space connected to the inlet is defined between an interior of the valve body and radially outer portions of the fixed disk and moving disk, wherein the moving disk is arranged to rotate relative to the fixed disk, wherein the fixed disk is provided with a plurality of through-holes extending axially through the fixed disk from the mating face to an opposing face thereof, wherein one of the through-holes in the face of the fixed disk is arc-shaped and is an outlet through-hole connected only to the outlet via an outlet passage in the valve body, wherein the fixed disk includes a radical arc-shaped bulge extending radially outwardly from the major circular portion of the fixed disk, wherein the outlet through-hole in the fixed disk extends radially outwardly into the radial arc-shaped bulge and includes an outer edge portion that is located further from the axis of rotation than the major portion of the outer edge of the moving disk having the same diameter, whereby flow communication between the inlet and the outlet is provided when the radially outer edge of the moving disk having the same diameter is in radial alignment with the radially outer edge of the outlet through-hole in the fixed disk, the outlet through-hole in the fixed disk and other through-holes in the fixed disk include portions located at a fixed distance relative to the center of the fixed disk, wherein a radially outer edge of the outlet through-hole of the fixed disk is located further from the center of the fixed disk than radially outer edges of the other through-holes of the fixed disk, wherein a radially inner edge of the outlet through-hole of the fixed disk is located closer to the center of the fixed disk than outer edges of the other through-holes of the fixed disk, wherein the moving disk is provided with an inlet through-hole that is open to said flow space, at least one blind hole located on the mating face of the moving disk that is arc-shaped, and the through-holes of the fixed disk being positioned to align with the through hole and at least one blind hole of the moving disk.

2. The control valve of claim 1, wherein a radially outer edge of the blind hole of the moving disk is located further from the center of the moving disk than the radially outer edge of the through-hole of the moving disk.

3. The control valve of claim 1, wherein
the fixed disk includes five or six through-holes arranged in five equal parts or six circumferential sectors of the fixed disk,
wherein the moving disk includes a radial arc-shaped bulge extending radially outwardly from a circular periphery of the moving disk, wherein the blind hole of the moving disk extends radially outwardly into the radial arc-shaped bulge of the moving disk, and
wherein the through-holes of the fixed disk can be aligned with the through hole and at least one blind hole of the moving disk as the moving disk is rotated.

4. The control valve of claim 1, wherein the outlet through-hole of the fixed disk and the blind hole located in the moving disk are aligned with each other when the control valve is in a softener or filter status.

5. The control valve of claim 1, wherein the outlet through-hole of the fixed disk and the blind hole located within the same diameter of the moving disk are overlapped incompletely to provide flow from the inlet to the outlet when the control valve is in regeneration or rinse status.

6. The control valve of claim 1, further including a water softener connected to the control valve.

7. The control valve of claim 1, further including an injector, wherein
the valve body is further provided with a drain channel and a brine absorption branch of a flow channel,
the valve body is further provided with an upper filter connector, a lower filter connector, and an injector inlet, an injector outlet connected to the lower filter, a brine inlet is connected to the brine absorption branch of the flow channel,
the through-holes are respectively distributed in six equal circumferential sectors on the mating face of the fixed disk,
on the mating face of the fixed disk, in a counterclockwise direction, a first through-hole and a second through-hole are connected to the upper filter connector via respective flow passages,
a third through-hole on the face of the fixed disk is connected to the lower filter connector via a flow passages,
a fourth through-hole on the face of the fixed disk is the outlet through-hole connected to the outlet via the flow space,
a fifth through-hole on the face of the fixed disk is connected to the injector inlet,
a sixth through-hole on the face of and in a center of the fixed disk that is connected to the drain of the valve body,
wherein the moving disk includes two blind holes including a radial blind hole that is from the center to circumferential direction in the mating face and an arc-shaped blind hole in the mating face,
wherein the moving disk includes a radial arc-shaped bulge extending radially outwardly from a circular periphery of the moving disk,
wherein the arc-shaped blind hole of the moving disk extends radially outwardly into the radial arc-shaped bulge of the moving disk,
wherein a radially outer edge of the arc-shaped blind hole of the moving disk is located further from the center of the moving disk than a radially outer edge of the through-hole of the moving disk, and
the arc-shaped bulge of the fixed disk is the same size and shape as the arc-shaped bulge of the moving disk.

8. The control valve of claim 7, wherein the injector inlet and the injector outlet are set on the brine absorption branch of the flow channel.

9. The control valve of claim 7, and, wherein the valve body is connected to a tank containing an ion exchange resin, and wherein the upper filter connector and the lower filter connector are located within the tank.

* * * * *